(12) United States Patent
Chereshnev et al.

(10) Patent No.: US 9,245,149 B1
(45) Date of Patent: Jan. 26, 2016

(54) SYSTEM AND METHOD FOR CONTROLING PRIVILEGES OF CONSUMERS OF PERSONAL DATA

(71) Applicant: Kaspersky Lab ZAO, Moscow (RU)

(72) Inventors: Evgeny M. Chereshnev, Moscow (RU); Vartan M. Minasyan, Moscow (RU)

(73) Assignee: Kaspersky Lab AO, Moscow (RU)

( * ) Notice: Subject to any disclaimer, the term of this patent is extended or adjusted under 35 U.S.C. 154(b) by 0 days.

(21) Appl. No.: 14/722,922

(22) Filed: May 27, 2015

(30) Foreign Application Priority Data

Mar. 31, 2015 (RU) .................. 2015111424

(51) Int. Cl.
*G06F 21/62* (2013.01)
*G06F 17/30* (2006.01)

(52) U.S. Cl.
CPC ...... *G06F 21/6245* (2013.01); *G06F 17/30876* (2013.01)

(58) Field of Classification Search
CPC ............ G06F 21/6245; G06F 21/6218; G06F 17/30867; G06F 17/30876; G06F 21/604; H04L 63/102; H04L 63/20
USPC .................................................... 726/27–30
See application file for complete search history.

(56) References Cited

U.S. PATENT DOCUMENTS

| | | | |
|---|---|---|---|
| 7,913,300 B1 | 3/2011 | Flank et al. | |
| 8,689,298 B2 | 4/2014 | Connor et al. | |
| 8,881,227 B2 | 11/2014 | Rajagopal et al. | |
| 9,021,604 B2 * | 4/2015 | Nicolas | 726/27 |
| 2002/0188589 A1 * | 12/2002 | Salmenkaita et al. | 707/1 |
| 2008/0189793 A1 * | 8/2008 | Kirkup et al. | G06F 21/53 726/27 |
| 2008/0214210 A1 * | 9/2008 | Rasanen et al. | 455/456.3 |
| 2010/0088364 A1 * | 4/2010 | Carter et al. | 709/203 |
| 2010/0185871 A1 * | 7/2010 | Scherrer et al. | 713/186 |
| 2010/0325122 A1 * | 12/2010 | Yassin | G06F 8/60 707/759 |
| 2011/0238482 A1 * | 9/2011 | Carney et al. | 705/14.36 |
| 2012/0072991 A1 * | 3/2012 | Belani et al. | 726/25 |
| 2013/0185292 A1 * | 7/2013 | Li et al. | G06F 17/30522 707/723 |
| 2013/0247224 A1 * | 9/2013 | Karlson et al. | 726/28 |
| 2014/0090091 A1 * | 3/2014 | Prakash et al. | 726/30 |
| 2014/0282852 A1 * | 9/2014 | Vestevich | G06F 21/6263 726/1 |

* cited by examiner

*Primary Examiner* — Catherine Thiaw
(74) *Attorney, Agent, or Firm* — Arent Fox LLP; Michael Fainberg

(57) ABSTRACT

Disclosed are systems, methods and computer program products for controlling privileges of consumers of personal data. An example method includes: formulating user requirements to personal data control quality; determining weighting factors for corresponding functions of application programming interfaces (APIs) for personal data control of a centralized personal data control system based on the formulated user requirements to personal data control quality; determining correspondence between the functions of APIs for personal data control of the centralized personal data control system and functions of APIs for personal data control of the consumer of personal data; calculating a personal data control rating of the consumer of personal data based on the determined correspondence and the determined weighting factors; and determining the privileges of the consumer of personal data based on the personal data control rating of the consumer of personal data.

17 Claims, 6 Drawing Sheets

150

File card for consumer of personal data

Information on consumer of personal data

Information 1

Rating of consumer          Value

...

Information N

List of authorizations

☒ Authorization 1
☐ Authorization 2
☒ Authorization 3
☐ ...
☐ Authorization M

History of interaction cancel    OK

Fig. 1C

SYSTEM AND METHOD FOR CONTROLLING PRIVILEGES OF CONSUMERS OF PERSONAL DATA

CROSS-REFERENCE TO RELATED APPLICATIONS

This application claims benefit of priority under 35 U.S.C. 119(a)-(d) to a Russian Application No. 2015111424 filed on Mar. 31, 2015, which is incorporated by reference herein.

FIELD OF TECHNOLOGY

The present disclosure relate generally to the field computer security, and, more particularly, to system and method for controlling privileges of consumers of personal data.

BACKGROUND

At present, web services (such as search engines, web mail, data storage services, social networks and others) and applications are collecting a mass of personal information about the user (behavior on the Web and on the computer, data sets, actions on the Internet, location, contacts with other users, etc.). This is occurring in a both open and clandestine manner, and very often without awareness by the user of the data collection. Neither is the user aware of how the collected data is used afterwards, or whether he can control this process.

Systems of centralized control of personal user information are being created to help the user exercise control over the use of personal data. These systems allow one to control the personal data of the user, to determine and monitor the volume of personal information collected and saved (such as a set of personal documents, date of birth, location, passwords for authorization on other services, history of actions on the Internet, characteristic behavior patterns, gender, family status, etc.), to determine the level of access by services to this information (from total anonymity to a fully open profile), and to carry out an authorization of services when accessing the personal user data.

As examples of such systems include MS Account, Apple ID, Google Account, Mozilla Persona, etc. However, all these technologies are tied to the infrastructure of a specific company and they exercise control over the personal user data by using unified application programming interfaces (APIs) for the interaction of the participants within an ecosystem. That is, all the services and applications within an ecosystem have a unified set of functions for control of the personal user data. These application programming interfaces include a set of API functions that are provided by the developer company.

But in the modern world users interact with the applications and services of various companies having their own application programming interfaces. Therefore, the personal data control functionality may differ from one service to another when integrating the centralized control system of personal user information with services from different ecosystems.

Thus, there exists a need to assess the functional capabilities of outside services in regard to control of personal user data.

SUMMARY

Disclosed are systems, methods and computer program products for controlling privileges of consumers of personal data. The disclosed technology is configured to assess services connected to a system of protected storage of personal data based on the functional capabilities of said services in regard to control of the personal user data. One technical result consists of controlling the access rights to the personal user data by assessing services based on the functional capabilities of said services in regard to control of the personal user data.

In one aspect, an example method for determining privileges of a consumer of personal data of a user, comprising: formulating user requirements to personal data control quality; determining weighting factors for corresponding functions of application programming interfaces (APIs) for personal data control of a centralized personal data control system based on the formulated user requirements to personal data control quality; determining correspondence between the functions of APIs for personal data control of the centralized personal data control system and functions of APIs for personal data control of the consumer of personal data; calculating a personal data control rating of the consumer of personal data based on the determined correspondence and the determined weighting factors; determining the privileges of the consumer of personal data based on the personal data control rating of the consumer of personal data; and applying the privileges to control access of the consumer to the personal data of the user.

In one example aspect, the requirements to personal data control quality are formulated based on functional capacities and combinations of functional capacities available within APIs of the centralized personal data control system.

In one example aspect, a function of the APIs for personal data control of the centralized personal data control system corresponds to a function of the APIs for personal data control of the consumer of personal data when these functions are analogous functions.

In one example aspect, the weighting factors may be zero for functions of the APIs for personal data control of the centralized personal data control system when these functions are not included in the requirements.

In one example aspect, the functions with zero weighting factors excluded from the calculating the personal data control rating of the consumer of personal data.

In one example aspect, the determining the privileges of the consumer of personal data is accomplished by comparing the personal data control rating of the consumer of personal data with a threshold value.

In one example aspect, the privileges of the consumer of personal data are expanded when the rating of the consumer of personal data is higher than the threshold value.

In one example aspect, the privileges of the consumer of personal data are reduced when the rating of the consumer of personal data is lower than the threshold value.

In another aspect, an example system for determining privileges of a consumer of personal data of a user, comprising: a hardware processor configured to: formulate user requirements to personal data control quality; determine weighting factors for corresponding functions of application programming interfaces (APIs) for personal data control of a centralized personal data control system based on the formulated user requirements to personal data control quality; determine correspondence between the functions of APIs for personal data control of the centralized personal data control system and functions of APIs for personal data control of the consumer of personal data; calculate a personal data control rating of the consumer of personal data based on the determined correspondence and the determined weighting factors; determine the privileges of the consumer of personal data based on the personal data control rating of the consumer of personal data; and apply the privileges to control access of the consumer to the personal data of the user.

In another aspect, an example non-transitory computer readable medium storing computer executable instructions for determining privileges of a consumer of personal data of a user, including instructions for: formulating user requirements to personal data control quality; determining weighting factors for corresponding functions of application programming interfaces (APIs) for personal data control of a centralized personal data control system based on the formulated user requirements to personal data control quality; determining correspondence between the functions of APIs for personal data control of the centralized personal data control system and functions of APIs for personal data control of the consumer of personal data; calculating a personal data control rating of the consumer of personal data based on the determined correspondence and the determined weighting factors; determining the privileges of the consumer of personal data based on the personal data control rating of the consumer of personal data; and applying the privileges to control access of the consumer to the personal data of the user.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, Illustrate one or more example aspects of the present disclosure and, together with the detailed description, serve to explain their principles and implementations.

FIG. 1C illustrates a sample of a file card for a consumer of personal data.

DETAILED DESCRIPTION

Example aspects are described herein in the context of a system, method and computer program product for control of privileges of personal data consumers. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items. The words "data" and "information" are used herein interchangeably.

For a better understanding of the invention, we shall introduce the term "consumer of personal data" (without quotation marks hereafter), which can be a service, an application, or a device working with personal user data. A consumer of personal data may be connected to a system of centralized control of personal user data, a description of which is provided below. An example of a consumer of personal data is Facebook or any other social network in which personal user data is processed. Control of the account of the user of any given social network can be done through a system of centralized control of personal user data. A consumer of personal data may be not only a social network or a cloud service, in the near future, as the Internet of Things is developed (a concept of a computing network of physical objects including embedded technologies for interacting with each other or with the environment), the consumers of personal data may be the physical objects in our environment, including TV sets (this has happed already), consumer appliances, cars, furniture, and clothing. The present disclosure allows ranking a variety of goods available on the market with respect to how carefully and precisely they handle the personal user data (for example, a catalogue or rating of goods by "honesty" or "trustworthiness").

Figure 1A:
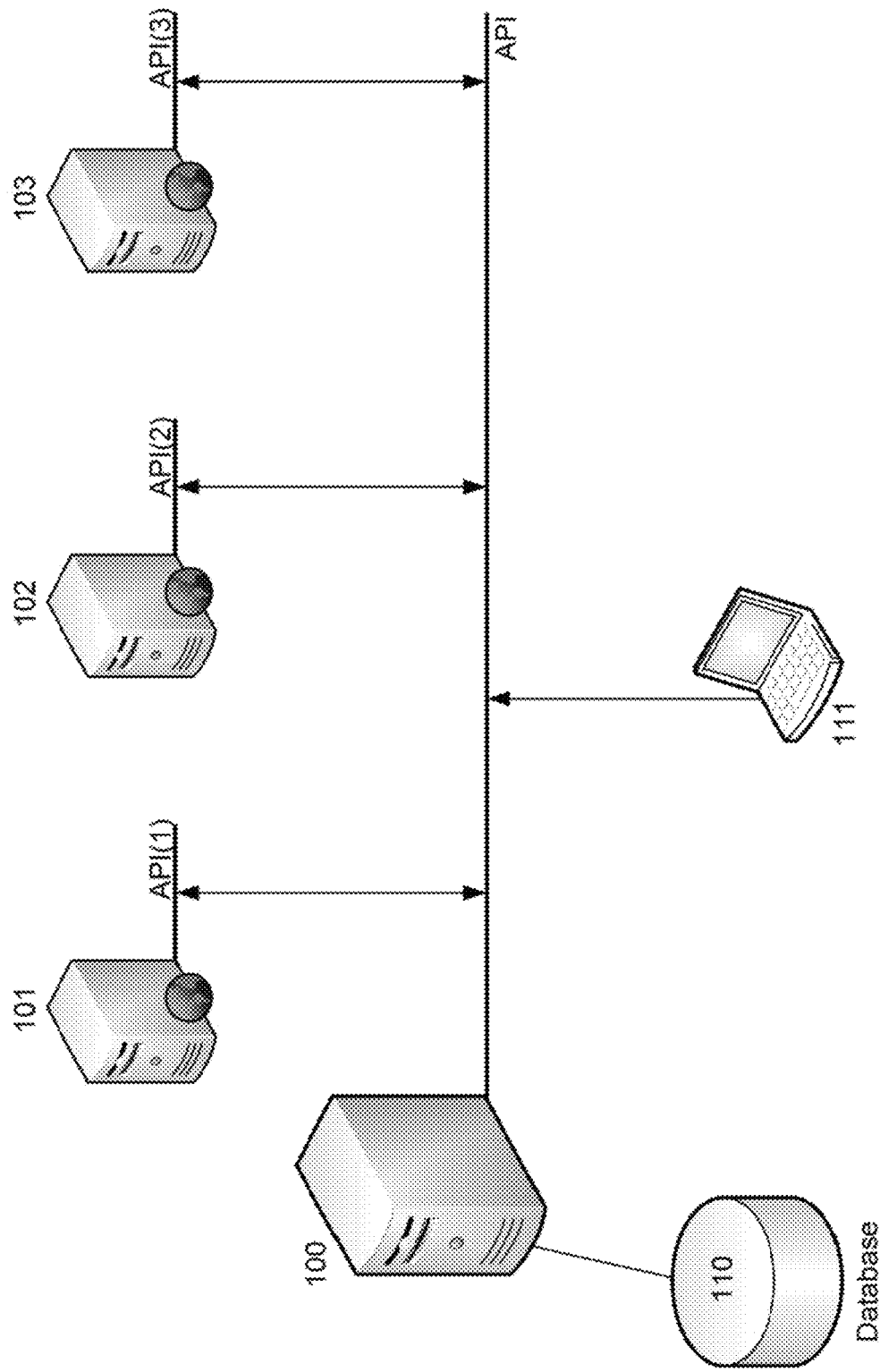
FIG. 1A shows a typical diagram of a user's interaction with consumers of personal data via a system of centralized control of personal data.

FIG. 1A shows a typical diagram of a user's Interaction with consumers of personal data via a system of centralized control of personal data. The actual system of centralized control of personal data 100 may constitute a server or group of servers connected to a database 110 in which the personal user data is contained—the user profiles which they would like to control, with all the personal information needed for a reliable authentication of the user or which is needed for the working of outside services. The database 110 can be decentralized; the data kept in it may belong to a particular company or government, but it also may not, and instead be distributed among database nodes such that the full information set is not concentrated at any one node. The user 111 may keep his personal information either in a public decentralized repository or in a personal repository (for example, on his own portable data storage medium), being able to select the information storage country or the company where the information is stored. Access to this data may be done by the system of centralized control of personal data 100 directly or through a device of the user 111. The system of centralized control of personal data 100 has APIs for control of the personal user data. The system of centralized control of personal data 100 interacts with the consumers of personal data 101, 102, 103, which have their own APIs for control of the personal data: API(1), API(2) and API(3), respectively. The API of the system of centralized control of personal data 100 is a unified set of application programming interfaces acting as a layer inserted between the consumers of personal data and the user profiles. Thus, for the interplay of the elements of the system as a whole it is necessary to establish a correspondence between the functional capabilities afforded by the system of centralized control of personal data 100 and the existing capabilities of the consumers of personal data 101, 102 and 103.

Figure 1B:
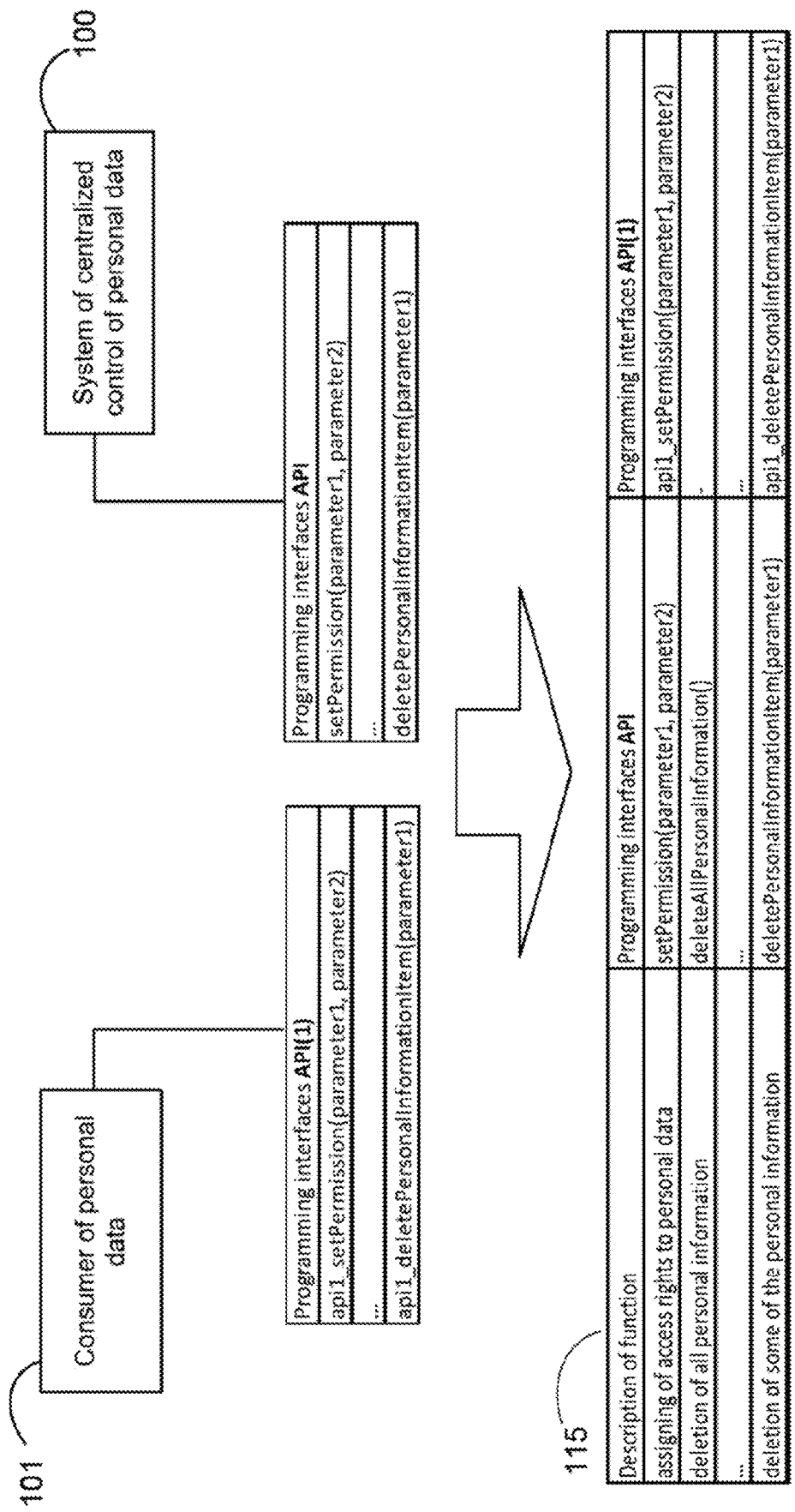
FIG. 1B illustrates an example of establishing a correspondence between application programming interfaces.

FIG. 1B shows a graphic example of establishing a correspondence between the APIs for control of personal data of the system of centralized control of personal data 100 and the API(1) for control of personal data of the consumer of personal data 101. For example, it is possible to provide within the APIs a function for assigning access rights to personal data setPermission(parameter1, parameter2) or a function for deletion of a portion of the personal information deletePersonalInformationItem(parameter1), while analogous functions api1_setPermission(parameter1, parameter2) and api1_deletePersonalInformationItem(parameter1) respectively can be realized within the API(1) of the consumer of personal data 101.

In one example aspect, the consumer of personal data 101 cannot perform certain functions within the set of API(1) for control of personal data. For example, the consumer of personal data 101 might not be able to perform encryption functions when working with the personal user data or, as shown in the table 115, depicted in FIG. 1B, there might be missing the function of deletion of all personal user data received, analogous to the function deleteAllPersonalInformation( ) within the APIs. Thus, upon comparing the functional capabilities of the consumer of personal data 101 with the functional capabilities afforded by the system of centralized control of personal data 100, a discrepancy will be discovered, consisting in the absence of at least one function of control of personal data, and for example, the function of deletion of all personal information.

In one example aspect, the calculation of a rating for control of personal data for a consumer of personal data is done by a complete comparison of the functional capabilities afforded by the system of centralized control of personal data and the functional capabilities afforded by the consumer of personal data. For example, if a function from the APIs of the system of centralized control of personal data 100 has an analogous function within the APIs of the consumer of personal data 101, this correspondence is rated as 1 and is given the numeric coefficient of 1, and if there are no analogues it is 0 and the numeric coefficient is 0. The consumer's rating in this aspect can be calculated by adding up the estimates of the correspondences of all the functions divided by the number of functions provided within the APIs of the system of centralized control of personal data 100. For example, within the APIs of the system of centralized control of personal data 100 there are realized 100 functions for control of personal data, 80 of which have analogues within the APIs of the consumer of personal data 101, while the remaining 20 have no analogues. Then the rating for control of personal data for the given consumer of personal data will be equal to (80*1+ 20*0)/100=0.8. In some aspects, if for a function from the APIs of the system of centralized control of personal data 100 there is a sequence of functions effectively performing an analogous function within the APIs of the consumer of personal data 101, this correspondence is rated as 1. In such aspects, it is enough for a sequence of consumer API functions to do what a system API function does to determine that the required functional capabilities afforded by the consumer of personal data exist.

FIG. 1C shows a sample of a file card (or profile) for a consumer of personal data 150. The file card presents to the user at least the following information: the history of the interaction with the given consumer of personal data, a current list of authorizations for access to personal data, and other information on the particular consumer of personal data, which might include a current consumer rating of the consumer of personal data. The consumer rating may outputted in the form of a numerical value, in percentage, by color indication (for example, from 0 to 0.3 red, from 0.3 to 0.7 yellow, and from 0.7 to 1 green) or by a combination of the above-indicated methods.

In another example aspect, the calculation of a rating for a consumer of personal data may be done individually for each user, taking into account his current requirements on quality of control of personal data. For example, if the user requirements are as follows:
  encryption of personal data during local storage of personal data by a consumer;
  ability to change geographical region of storage of personal data stored locally by a consumer;
  ability to delete all personal data stored locally by a consumer;
then the calculation of the rating of the consumer can be done by a reduced set of functions, only those having a relation to the selected requirements of the user.

In another example aspect, the user's requirements for the quality of control of personal data can be expressed by numeric weighting factors, filtering out or diminishing the influence of a less important functionality in the final rating and increasing the influence of a functionality belonging to the requirements requested.

The user's requirements for the quality of control of personal data can be specified in detail by selecting requirements from a list of available requirements or, for example, by moving a cursor between predetermined levels of quality of control of personal data (let us call them privacy levels), for example, from a low level of privacy to a very high level of privacy, where each level of privacy already corresponds to a set of predetermined requirements on the quality of control of personal data.

The requirements on quality of control of personal data by a consumer of personal data can be formulated on the basis of any given functional capabilities (or combinations thereof) which are afforded within the APIs of the system of centralized control of personal data 100, such as:
  local storage in a given geographical region in the event of copying of personal data;
  ability to change geographical region of storage of personal data stored locally by a consumer;
  encryption of personal data during local storage of personal data by a consumer;
  ability to delete all personal data stored locally by a consumer;
  ability to revoke access rights to personal data.

In one example aspect, the user profile can specify, for example, a user access rating, e.g., a minimum threshold value of the rating for control of personal data above which the user is willing to interact with the given consumer of personal data or willing to broaden the access rights (list of authorizations) for access to his personal data. For example, the user is willing to allow copying and local storage of his personal information to a consumer of personal data if the consumer's personal data control rating is above 0.8.

In another example aspect, the minimum threshold value may be controlled externally (by setting this value from outside by an external control system), for example, for setting it in accordance with corporate or state personal data management policies (or security policies) or with work rules in a specific environment, so that a user can set different minimum threshold values of the rating for various user profiles.

The consumer's personal data control rating of the consumers of personal data 101, 102, 103 can be automatically recalculated upon changing of requirements on the part of the user or changing of functional capabilities of the consumers of personal data. Upon a change in the consumer's personal data control rating of a consumer of personal data, the system of centralized control of personal data can automatically alert the user or compare the new consumer rating value with the current user access rating (minimum threshold value) and adopt the appropriate rule for the event occurring. For example, if the current value of the consumer's personal data control rating for a consumer of personal data is higher than the user access rating (minimum threshold value), the system of centralized control of personal data 100 may automatically broaden the privileges (rights) of the given consumer for the access to and use of the personal user data. Or, in the opposite case, if after recalculating the consumer's personal data control rating of a consumer of personal data the current consumer rating value may be decreased (for example, if the requirements for quality of control of personal data have been tightened) and it is not higher than the user access rating (minimum threshold value), the system of centralized control of personal data 100 may automatically limit (narrow) the privileges (rights) of the given consumer for the access to and use of the personal user data.

A current rating, for example, one averaged over all the users, may constitute information for the consumers of personal data on a paid or free basis to form an estimate of the level of satisfaction of the users with the quality of operation of the consumer of personal data in order to determine a functionality requiring further refinement on the part of the consumer of personal data.

Figure 2:
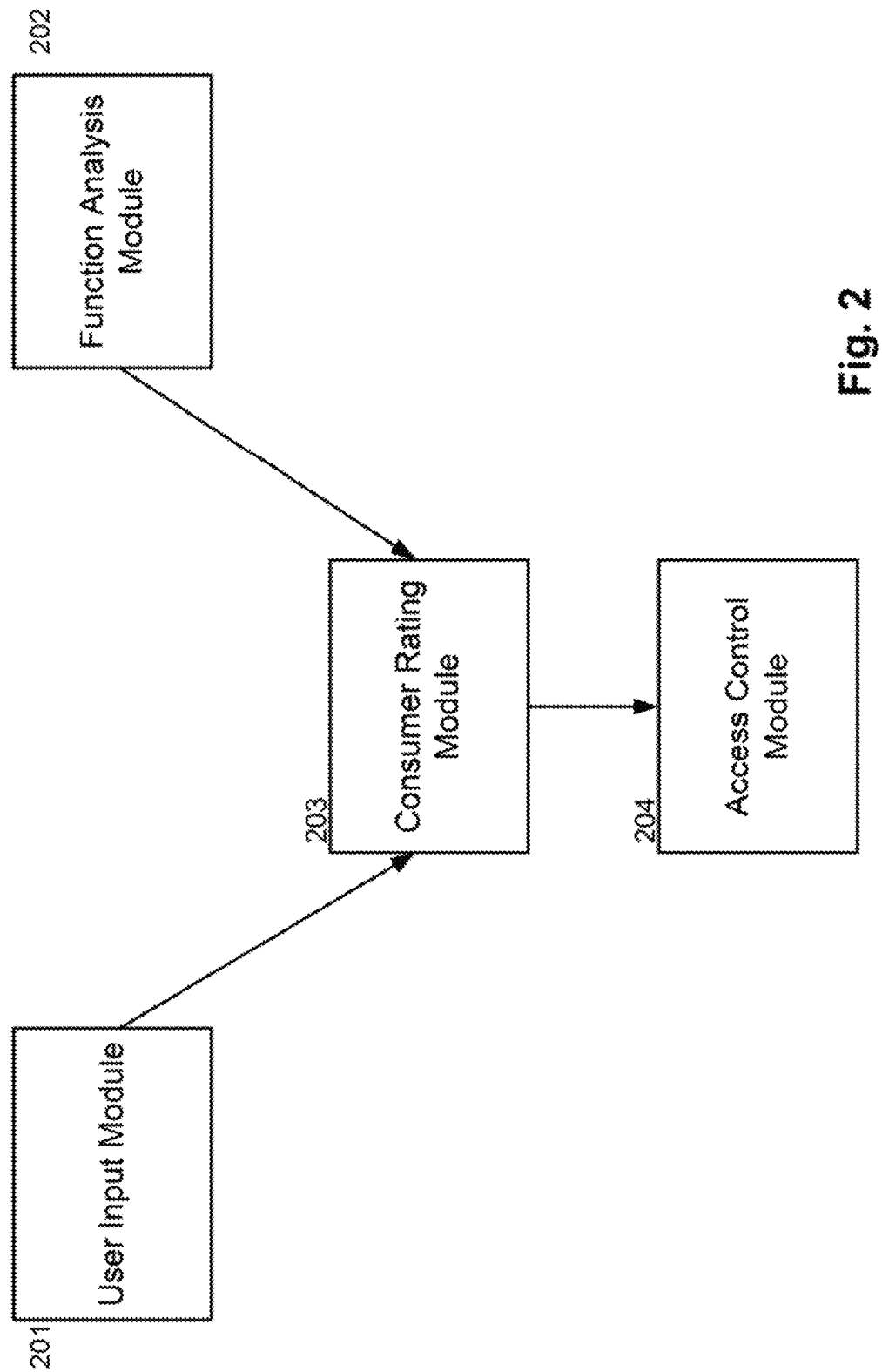
FIG. 2 shows a diagram of a system for calculating a rating for a consumer of personal user data.

FIG. 2 shows an example system for calculating a rating for a consumer of personal user data, comprising: a user input module 201, connected to a consumer rating module 203, and a function analysis of module 202, also connected to the consumer rating module 203. The user input module 201 collects the requirements of the user for the quality of control of personal data. Each requirement for the quality of control of personal data is related to at least one personal data control function from the APIs of the system of centralized control of personal data 100. For example, the requirement of the consumer of personal data having functional capabilities for deletion of all personal data stored locally by the consumer is associated with the function <<deleteAllPersonalInformation>> from the APIs of the system of centralized control of personal data 100, while the requirement of the consumer of personal data having functional capabilities for encryption may correspond to several functions at the same time from the APIs of the system of centralized control of personal data 100. The user input module 201 determines the numeric weighting factors for the corresponding functions from the APIs for control of personal data of the system of centralized control of personal data 100 on the basis of the requirements formulated by the user for the quality of control of personal data. The numeric weighting factors can be used for ranking the requirements on quality of control of personal data in terms of importance so as to obtain more accurate results. If weighting factors are not used, then all of the requirements become equivalent in relation to each other. The importance of each of the requirements can be specified within the system of centralized control of personal data 100, for example, based on the company policy or view of the system of centralized control of personal data 100. Likewise, the importance of each of the requirements can be personalized for each specific user, based on his view and desires. Moreover, the importance of the requirements can be determined by the user for each particular consumer of personal data. The importance of the requirements can be specified by numerical weight values, for example, from 0 to 100, or by quality parameters, such as "low importance", "medium importance" and "high importance", which in turn will be transformed into numerical values for determining the numeric weighting factors. There may be various methods for calculating the numeric weighting factors and these are not essential features in the context of the present disclosure. One essential feature, however, is the ranking of the requirements for quality of control of personal data in terms of importance, so as to obtain more accurate results of calculating the consumer's personal data control rating of a consumer of personal data. In one example aspect, the numeric weighting factors may be equal to zero for functions of the APIs for control of personal data of the system of centralized control of personal data 100 if these functions are not included among the user requirements. In such an event, functions with zero weighting factors can be excluded from the calculation of the consumer's personal data control rating of the consumer of personal data. Thus, as mentioned above, the calculation of the consumer rating of the consumer can be done with a reduced set of functions, only those having a relation to the requirements selected by the user.

The function analysis module 202 is configured to compare the functional capabilities of the system of centralized control of personal data and of the consumers of personal data, thereby establishing a correspondence between the functions from the APIs for control of personal data of the system of centralized control of personal data 100 and the functions from the APIs for control of personal data of the consumer of personal data.

The consumer rating module 203 is connected to the user input module 201 and to the function analysis module 202. The consumer rating module 203 is configured to calculate the consumer's personal data control rating of the consumer of personal data from the correspondence established between the functions from the APIs for control of personal data of the system of centralized control of personal data 100 and the functions from the APIs for control of personal data of the consumer of personal data; and from the numeric weighting factors of the functions from the APIs for control of personal data of the system of centralized control of personal data 100, which have been determined on the basis of the requirements formulated by the user for the quality of control of personal data.

An access control module 204 is connected to the consumer rating module 203 and configured to determine the privileges of the consumer of personal data on the basis of the consumer's personal data control rating of the consumer of personal data. The access control module 204 can determine the access privileges of the consumer of personal data by comparing the consumer's personal data control rating of the consumer of personal data with a user access rating (threshold value). Thus, the access control module 204 for example can broaden the privileges of the consumer of personal data if the rating of the consumer of personal data is higher than the user access rating (threshold value), or restrict the privileges of the consumer of personal data if the rating of the consumer of personal data is below the user access rating (threshold value).

Figure 3:
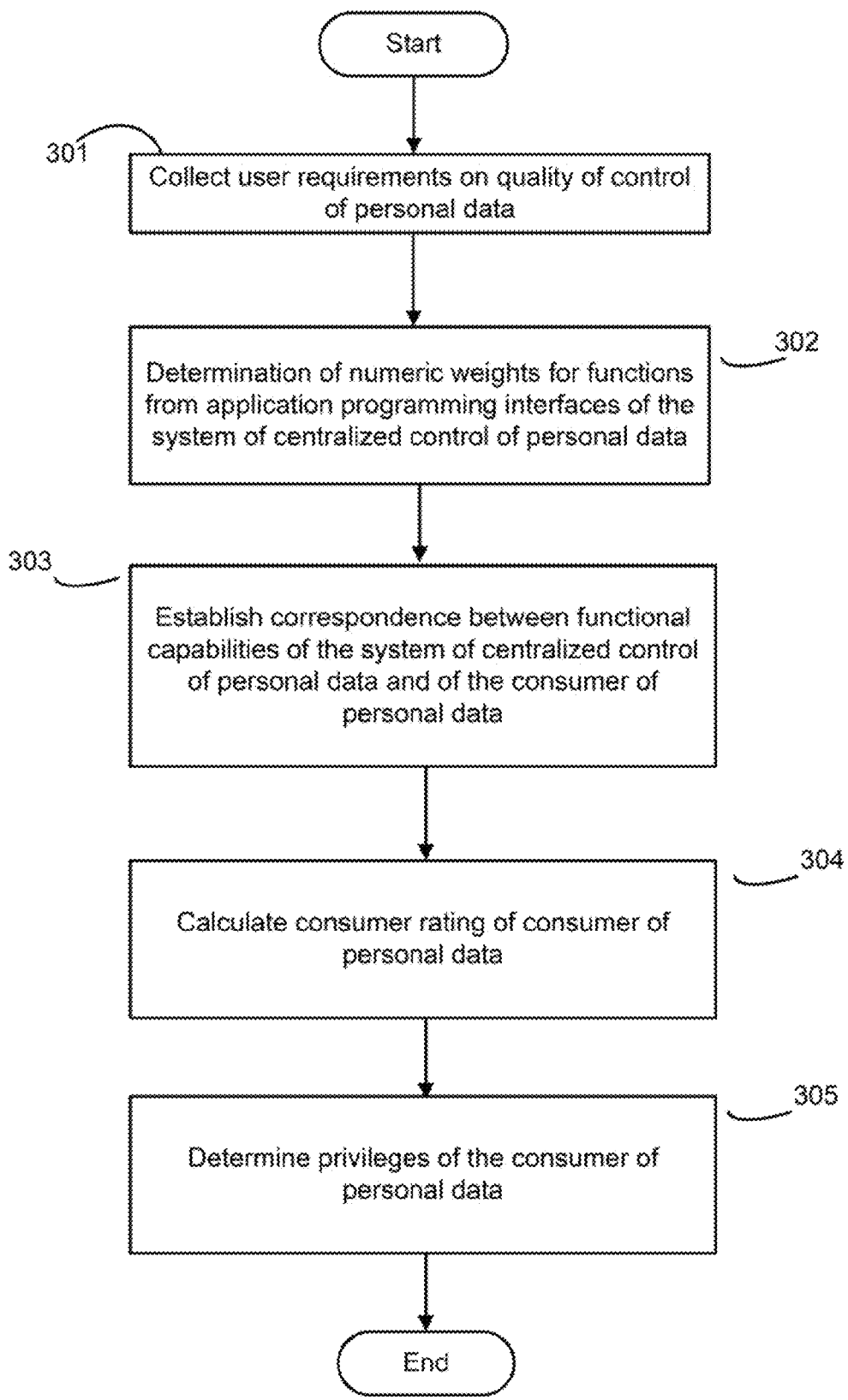
FIG. 3 shows a block diagram of a method of calculating the rating for a consumer of personal user data.

FIG. 3 shows a block diagram of a method of calculating the consumer rating for a consumer of personal user data or user information, in which during step 301 there is a collection of user requirements on the quality of control of personal data. Next, during step 302, based on the formulated requirements of the user, numeric weighting factors are determined for the functions of the APIs of the system of centralized control of personal data 100. During step 303 a correspondence is established between the functional capabilities of the system of centralized control of personal data and the functional capabilities of the consumer of personal data. Next, in step 304, the consumer's personal data control rating is calculated for the consumer of personal data. After this, in step 305, the privileges of the consumer of personal data are determined.

Figure 4:
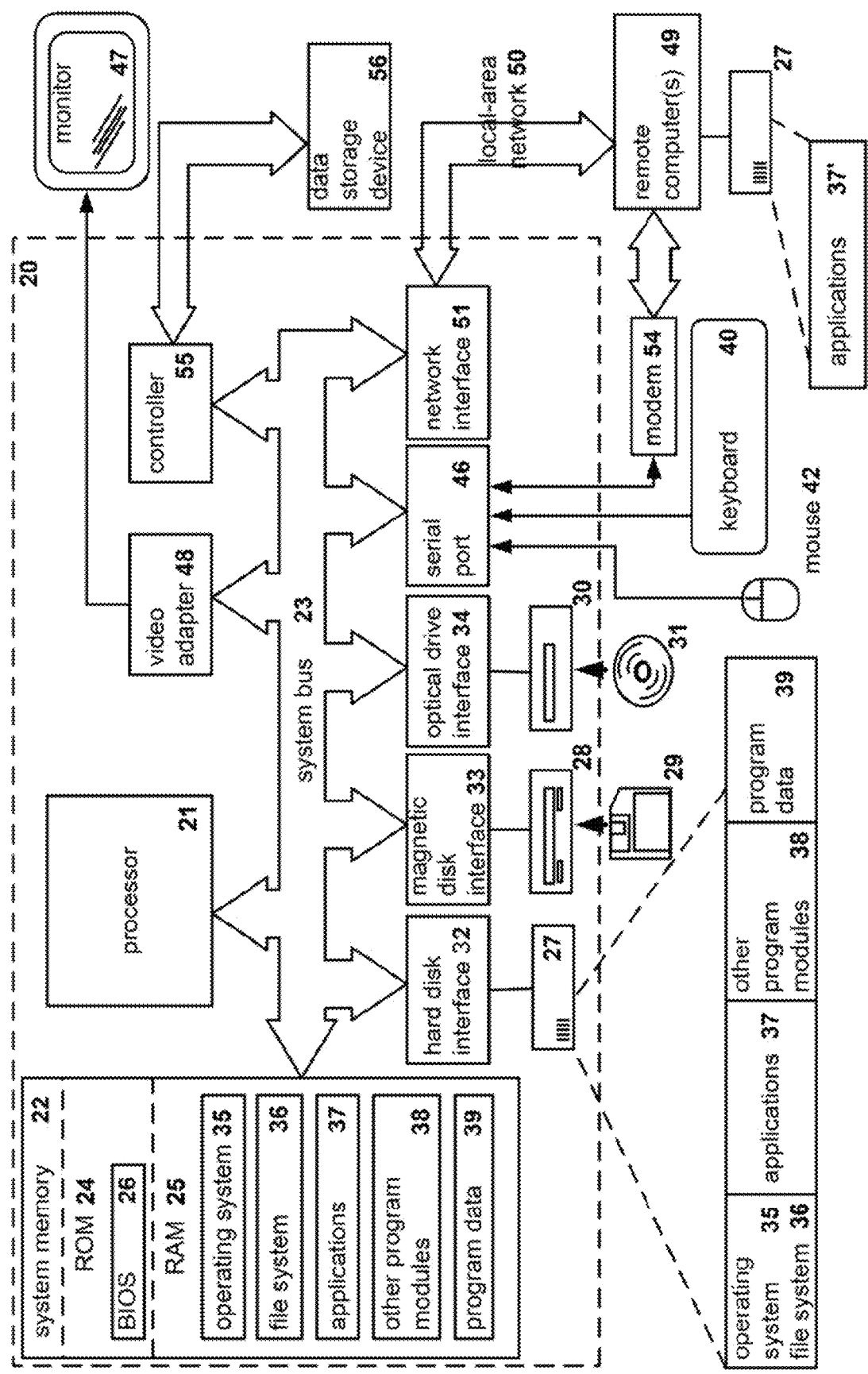
FIG. 4 shows an example of a general-purpose computer that may be used to implement systems and methods for controlling privileges of consumers of personal data.

FIG. 4 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for determining privileges of a consumer of personal data of a user, comprising:
   collecting, by a processor of a computing device, associated with a centralized personal data control system, user requirements for personal data control quality;
   determining, by the processor, weighting factors for corresponding functions of application programming interfaces (APIs) for personal data control of the centralized personal data control system based on the user requirements for personal data control quality;
   determining a correspondence, by the processor, between functions of APIs for personal data control of the centralized personal data control system and functions of APIs for personal data control of the consumer of personal data, by detecting for each user requirement, that a first function of the APIs for personal data control of the centralized personal data control system is analogous to a second function of APIs for personal data control of a consumer of personal data, and associating the first function to the second function;
   calculating, by the processor, a personal data control rating of the consumer of personal data based on the determined correspondence and the determined weighting factors;
   determining, by the processor, the privileges of the consumer of personal data based on the personal data control rating of the consumer of personal data; and
   applying, by the processor, the privileges to control access of the consumer to the personal data of the user, wherein the consumer accesses the personal data of the user over a communication network.

2. The method of claim 1, wherein the requirements for personal data control quality are determined based on functional capacities and combinations of functional capacities available within APIs of the centralized personal data control system.

3. The method of claim 1, wherein the weighting factors are configured to be zero for functions of the APIs for personal data control of the centralized personal data control system when the functions are not included in the requirements.

4. The method of claim 3, wherein the functions with zero weighting factors are excluded from the calculating the personal data control rating of the consumer of personal data.

5. The method of claim 1, wherein the determining the privileges of the consumer of personal data comprises comparing the personal data control rating of the consumer of personal data with a threshold value.

6. The method of claim 5, wherein the privileges of the consumer of personal data are expanded when the rating of the consumer of personal data is greater than the threshold value.

7. The method of claim 5, wherein the privileges of the consumer of personal data are reduced when the rating of the consumer of personal data is less than the threshold value.

8. A system for determining privileges of a consumer of personal data of a user, comprising:
   a hardware processor configured to:
      collect user requirements for to personal data control quality;
      determine weighting factors for corresponding functions of application programming interfaces (APIs) for personal data control of the centralized personal data control system based on the user requirements for personal data control quality;
      determine a correspondence between functions of APIs for personal data control of the centralized personal data control system and functions of APIs for personal data control of the consumer of personal data, by detecting for each user requirement, that a first function of the APIs for personal data control of the centralized personal data control system is analogous to a second function of APIs for personal data control of a consumer of personal data, and associating the first function to the second function;
      calculate a personal data control rating of the consumer of personal data based on the determined correspondence and the determined weighting factors;
      determine the privileges of the consumer of personal data based on the personal data control rating of the consumer of personal data; and
      apply the privileges to control access of the consumer to the personal data of the user, wherein the consumer accesses the personal data of the user over a communication network.

9. The system of claim 8, wherein the requirements for personal data control quality are determined based on functional capacities and combinations of functional capacities available within APIs of the centralized personal data control system.

10. The system of claim 8, wherein the weighting factors are configured to be zero for functions of the APIs for personal data control of the centralized personal data control system when the functions are not included in the requirements.

11. The system of claim 10, wherein the functions with zero weighting factors are excluded from the calculating the personal data control rating of the consumer of personal data.

12. The system of claim 8, wherein the determining the privileges of the consumer of personal data comprises comparing the personal data control rating of the consumer of personal data with a threshold value.

13. The system of claim 12, wherein the privileges of the consumer of personal data are expanded when the rating of the consumer of personal data is greater than the threshold value.

14. The system of claim 12, wherein the privileges of the consumer of personal data are reduced when the rating of the consumer of personal data is less than the threshold value.

15. A non-transitory computer readable medium storing computer executable instructions for determining privileges of a consumer of personal data of a user, including instructions for:
   collecting user requirements for personal data control quality;
   determining weighting factors for corresponding functions of application programming interfaces (APIs) for personal data control of the centralized personal data control system based on the formulated user requirements for personal data control quality;
   determining a correspondence between functions of APIs for personal data control of the centralized personal data control system and functions of APIs for personal data control of the consumer of personal data, by detecting for each user requirement, that a first function of the APIs for personal data control of the centralized personal data control system is analogous to a second function of APIs for personal data control of a consumer of personal data, and associating the first function to the second function;

calculating a personal data control rating of the consumer of personal data based on the determined correspondence and the determined weighting factors;

determining the privileges of the consumer of personal data based on the personal data control rating of the consumer of personal data; and applying the privileges to control access of the consumer to the personal data of the user, wherein the consumer accesses the personal data of the user over a communication network.

16. The non-transitory computer readable medium of claim 15, wherein the requirements for personal data control quality are determined based on functional capacities and combinations of functional capacities available within APIs of the centralized personal data control system.

17. The non-transitory computer readable medium of claim 15, wherein the weighting factors are configured to be zero for functions of the APIs for personal data control of the centralized personal data control system when the functions are not included in the requirements.

\* \* \* \* \*